United States Patent
Sumida et al.

[11] Patent Number: 5,866,278
[45] Date of Patent: Feb. 2, 1999

[54] ELECTROLYTIC MANGANESE DIOXIDE, PROCESS FOR PREPARING THE SAME, AND MANGANESE DRY CELL

[75] Inventors: Hiroshi Sumida; Takuya Inoue; Kiyoteru Enomoto, all of Takehara; Hajime Murakami, Kadoma; Michiko Inui, Kadoma; Yoshihiro Sakurai, Kadoma, all of Japan

[73] Assignees: Mitsui Mining & Smelting Co., Ltd., Tokyo; Matsushita Electric, Osaka, both of Japan

[21] Appl. No.: 758,823

[22] Filed: Dec. 4, 1996

[30] Foreign Application Priority Data

Jan. 8, 1996 [JP] Japan .................................. 8-016990

[51] Int. Cl.⁶ ........................... C01G 45/02; H01M 4/50; C25B 1/00
[52] U.S. Cl. ......................... 429/224; 205/539; 423/605
[58] Field of Search .................................. 423/605, 599; 429/224; 205/539, 541, 542

[56] References Cited

U.S. PATENT DOCUMENTS 4,728,672  3/1988  Yoshinari et al. ........................ 518/717
5,698,176  12/1997  Capparella et al. ...................... 423/605

OTHER PUBLICATIONS

Chemical Abstracts, vol. 90, No. 22, May 28, 1979, 175146.
Patent Abstracts of Japan, vol. 6, No. 6, Jan. 14, 1982, JP 56–126263 A, Oct. 3, 1981.
Patent Abstracts of Japan, vol. 15, No. 258, Jun. 28, 1991, JP 3–84864 A, Apr. 10, 1991.

Kolta et al., "Application of the B.E.T. Method to Differentiating Manganese Dioxide Modifications", J. Appln. Chem. Biotechnol., vol. 21, No. 6, Jun. 1971, pp. 154–158.

*Primary Examiner*—Kathryn Gorgos
*Assistant Examiner*—William T. Leader
*Attorney, Agent, or Firm*—Kubovcik & Kubovcik

[57] ABSTRACT

An electrolytic manganese dioxide having a composition of $MnO_x$, wherein X is 1.90 to 1.96, an adhesive moisture content of not less than 1.5% by weight as measured according to the procedure specified in JIS, and a content of bound water, eliminative in the temperature range of 120° to 400° C., of not less than 3.0% by weight as measured by gravimetry, a process for preparing the same, and a manganese dry cell comprising a cathode mix comprised of a mixing of the electrolytic manganese dioxide with a conductive acetylene black, preferably a conductive acetylene black having a BET specific surface area of 70 to 2.50 $m^2/g$, and an electrolyte composed mainly of zinc chloride and/or ammonium chloride. In the process of preparing the electrolytic manganese dioxide, after electrolysis and during or after neutralization, the manganese dioxide is heated in an aqueous solution at 50° to 100° C. for 12 to 48 hours in the presence of an alkaline ammonium compound.

4 Claims, 2 Drawing Sheets

ELECTROLYTIC MANGANESE DIOXIDE, PROCESS FOR PREPARING THE SAME, AND MANGANESE DRY CELL

BACKGROUND OF THE INVENTION

1. Field of the Invention

This invention relates to an eletrolytic manganese dioxide having particular properties, a process for preparing the same, and a manganese dry cell comprising a cathode active material comprised of a mixture of said electrolytic manganese dioxide with a conductive acetylene black, especially a conductive acetylene black having a BET specific surface area of 70 to 250 m$^2$/g, and an electrolyte composed mainly of zinc chloride and/or ammonium chloride.

2. Description of the Prior Art

A manganese dry cell comprising an electrolytic manganese dioxide as a cathode active material, a zinc alloy as an anode active material, and an aqueous solution, as an electrolyte, composed mainly of zinc chloride and/or ammonium chloride is well known in the art.

The electrolytic manganese dioxide used in the cathode of this manganese dry cell has hitherto been prepared, for example, by practicing the steps of electrolysis, then washing with water or hot water, and neutralization. A manganese dry cell using the above electrolytic manganese dioxide as the cathode has a problem that, during storage, the electrolytic manganese dioxide is reacted with a conductive acetylene black to evolve carbon dioxide gas, increasing the internal resistance during discharge, which causes the properties to deteriorate with prolonging the storage period. This tendency is more significant under high drain conditions required, in recent years, of dry cells, making it urgently necessary to solve this problem.

Further, in recent years, in order to improve high drain characteristics of manganese dry cells, an attempt has been made to use a conductive acetylene black having a high specific surface area to improve the ability of the electrolytic manganese dioxide to absorb and hold the electrolyte necessary for the discharge reaction. The conductive acetylene black having such a high specific surface area, however, unfavorably has high reactivity with the electrolytic manganese dioxide.

On the other hand, a conductive acetylene black having a low reactivity with the electrolytic manganese dioxide is unsatisfactory in the capability of holding the electrolyte, resulting in deteriorated high drain characteristics.

In order to overcome this problem, the electrolytic manganese dioxide can be heated in air to lower the reactivity. This, however, reduces the amount of adhesive moisture which is very important for discharge characteristics of manganese dry cells. In particular, heating at 100° C. or above results in loss of bound water as well, posing a problem that the initial discharge characteristics per se of the dry cells are remarkably deteriorated.

Storage of the electrolytic manganese dioxide for a very long period of time is another means to prevent the reaction between the electrolytic manganese dioxide with the conductive acetylene black. However, it is difficult to produce such electrolytic manganese dioxide on a commercial scale.

SUMMARY OF THE INVENTION

An object of this invention is to provide an electrolytic manganese dioxide, which can prevent a reaction between an electrolytic manganese dioxide and a conductive acetylene black, especially a conductive acetylene black having a BET specific surface area of 70 to 250 m$^2$/g, used in a cathode active material of a manganese dry cell, to improve initial discharge characteristics and storage properties, a process for preparing the same, and a manganese dry cell using said electrolytic manganese dioxide as a cathode active material.

Under the above circumstances, the present inventors have made extensive and intensive studies and, as a result, have found that the storage properties of a manganese dry cell can be improved when, in order to reduce the amount of a gas evolved during storage of a manganese dry cell, a powdery or chipped electrolytic manganese dioxide after electrolysis is heated in an aqueous solution in the presence of an alkaline ammonium compound reactive with sulfuric acid to prepare an electrolytic manganese dioxide having a water content (in terms of adhesive moisture content and bound water content), equivalent to that of an electrolytic manganese dioxide prepared by the conventional process, and having a composition of MnOx, wherein x is 1.90 to 1.96, which is then mixed with a conventional conductive acetylene black having a BET specific surface area of about 60 m$^2$/g and an electrolyte composed mainly of zinc chloride and/or ammonium chloride to prepare a cathode mix which is then used in a manganese dry cell and that a high-performance manganese dry cell can be prepared when a conductive acetylene black having a BET specific surface area of 70 to 250 m$^2$/g is used as the conductive acetylene black and mixed with the above electrolytic manganese dioxide to prepare a cathode mix which is then used in the manganese dry cell, which has led to the completion of this invention.

Thus, according to one aspect of this invention, there is provided a process for preparing an electrolytic manganese dioxide, characterized by comprising the step of: heating a powdery or chipped electrolytic manganese dioxide after electrolysis, during or after neutralization, in an aqueous solution at 50° to 100° C. in the presence of an alkaline ammonium compound reactive with sulfuric acid.

According to another aspect of this invention, there is provided an electrolytic manganese dioxide having a composition of MnOx, wherein x is 1.90 to 1.96, an adhesive moisture content of not less than 1.5% by weight as measured according to the procedure specified in JIS K 1467-1984, and a content of bound water, eliminative in the temperature range of 120° to 400° C., of not less than 3.0% by weight as measured by gravimetry.

According to a further aspect of this invention, there is provided a manganese dry cell comprising a cathode mix comprised of a mix of the above electrolytic manganese dioxide with a conductive acetylene black, especially a conductive acetylene black having a BET specific surface area of 70 to 250 m$^2$/g, and an electrolyte composed mainly of zinc chloride and/or ammonium chloride.

This invention will be described in more detail.

One possible cause of the deterioration in discharge characteristics of a manganese dry cell after storage is that an electrolytic manganese dioxide and a conductive acetylene black contained in a cathode mix are reacted with each other to evolve carbon dioxide gas which increases the internal pressure of the cell to thereby deteriorate the contact between an anode separator and the cathode mix, lowering the reaction rate.

In order to prevent a deterioration in initial characteristics of the cell, it is important to satisfy such a requirement that the water content (in terms of adhesive moisture content and bound water content) of the electrolytic manganese dioxide is satisfactorily maintained and, at the same time, the value of x in MnOx is in a given range.

The present inventors have paid attention to the above fact and have made a series of studies on an electrolytic manganese dioxide satisfying the above requirements and, as a result, have found that, in the step of treating a manganese dioxide product after electrolysis, the addition of an alkaline ammonium compound, reactive with sulfuric acid, during or after neutralization followed by heating in an aqueous solution at 50° to 100° C. enables the preparation of an electrolytic manganese dioxide which can solve the above problem. This heating in an aqueous solution is hereinafter referred to as "hydrothermal treatment."

A mutual reaction, between manganese oxides having different oxidation numbers, wherein a manganese oxide of high oxidation number, which is likely to react with the conductive acetylene black, is reacted with a manganese oxide of lower oxidation number to remove both of these oxides unnecessary for the discharge reaction, realizes the preparation of an electrolytic manganese dioxide free from deterioration in initial discharge characteristics of the cell and having excellent storage properties. Although the reaction mechanism has not been elucidated yet, it is believed that an alkaline ammonium compound reactive with sulfuric acid, in the course of a reaction thereof, at a high temperature, with a sulfuric acid ion present in the electrolytic manganese dioxide, plays a role as a catalyst which accelerates the following mutual reaction:
Chemical formula 1

wherein x+y=4 and x>y.

Alkaline ammonium compounds reactive with sulfuric acid include ammonium hydroxide, ammonium carbonate, and ammonium bicarbonate.

An electrolytic manganese dioxide capable of preventing the reaction thereof with the conductive acetylene black can be prepared by heating the electrolytic manganese dioxide in air in the presence of an ammonium compound or an ammonium ion. In this case, however, the water content (in terms of adhesive moisture content and bound water content) of the electrolytic manganese dioxide, an important factor for discharge characteristics, should be maintained. For this reason, the moisture partial pressure during heating should be kept high, increasing the cost of facilities and treatment, which is unfavorable for treating a large amount of electrolytic manganese dioxide on a commercial scale.

The reason why the hydrothermal treatment temperature is set to be 50° to 100° C. in the preparation of the electrolytic manganese dioxide, of this invention, wherein a deterioration in storage properties has been prevented while maintaining the initial discharge characteristics, is as follows. In the preparation of the electrolytic manganese dioxide on a commercial scale, when the hydrothermal treatment temperature is below 50° C., the time necessary for the treatment becomes excessively long, while a temperature above 100° C. leads to remarkably increased energy cost and lowered solubility of the ammonium ion in water, which in turn increases evaporation loss and, hence, renders the treatment at such a high temperature unrealistic from the viewpoint of economy. The hydrothermal treatment temperature is preferably 80° to 90° C.

The manganese dioxide thus obtained has a composition of MnOx, wherein x is 1.90 to 1.96, an adhesive moisture content of not less than 1.5% by weight as measured according to the procedure specified in JIS K 1467-1984, and a content of bound water, eliminative in the temperature range of 120° to 400° C. of not less than 3.0% by weight as measured by gravimetry. When the value of x is less than 1.90, the initial discharge properties are deteriorated. This is probably because the content of $MnO_2$ per se necessary for the discharge reaction is low with the content of oxides, of lower oxidation number, which do not contribute to the discharge, being high. When the value of x exceeds 1.96, the oxide of high oxidation number remains unreacted, resulting in unsatisfactory prevention of the reaction of the electrolytic manganese dioxide with the conductive acetylene black. When the content of adhesive moisture is less than 1.5% by weight and when the content of bound water is less than 3.0% by weight, the initial discharge characteristics are deteriorated. The "adhesive moisture content" is obtained from the loss when a sample is dried by heating it at 107°±2° C. for 2 h. The apparatus and device used to measure the adhesive moisture content may be as follows:

(1) Oven: One capable of controlling a temperature at 107°±2° C.
(2) Flat type weighing bottle: One of 50 mm×30 mm in nominal size specified in JIS R 3503.

The operation is carried out as follows:

(1) Weigh out about 5 g sample into a flat type weighing bottle, spread it so that its thickness becomes approximately uniform, cover it and measure its mass to the nearest 1 mg.
(2) Dry it by heating it for 2 h keeping the cover removed in the oven kept at 107°±2° C., cover the weighing bottle, put it into a desiccator and let it stand to cool to room temperature. Thereafter measure its mass to the nearest 1 mg.

When the BET specific surface area of the conductive acetylene black exceeds 250 $m^2/g$, the initial discharge characteristics are improved. In this case, however, the remaining ratio of the manganese dry cell after storage is lowered, resulting in deteriorated discharge characteristics after storage. The term "remaining ratio" used herein is intended to mean the percentage duration of discharge after storage with the duration of discharge, immediately after the preparation of the cell, being presumed to be 100%.

Mixing of an electrolytic manganese dioxide having such particular properties with a conductive acetylene black, especially an acetylene black having a BET specific surface area of 70 to 250 $m^2/g$, and an electrolyte composed mainly of zinc chloride and/or ammonium chloride to prepare a cathode mix can provide the manganese dry cell, of this invention, which has been improved in storage properties, as well as in initial discharge characteristics.

DESCRIPTION OF THE PREFERRED EMBODIMENTS

This invention will be described in more detail with reference to the following Examples and Comparative Examples.

Example 1

3 kg of an electrolytic manganese dioxide was electrodeposited in a sulfate bath under conditions of current density 70 A/m², electrolyte temperature 90° C. (constant), and manganese: sulfuric acid molar ratio in electrolyte=1.5, coarsely crushed, washed with 5 liters of hot water at 90° C. for 30 min and decanted. An equal amount of water was added thereto, and the mixture was stirred for 24 hr, washed, and then again decanted. The electrolytic manganese dioxide thus obtained was neutralized with ammonium carbonate to JIS pH 5.5, subjected to hydrothermal treatment at 90° C. for 32 hr, dried at 40° C. for one hr, and pulverized to an average particle diameter of about 25 μm, thereby preparing an electrolytic manganese dioxide.

Figure 1:
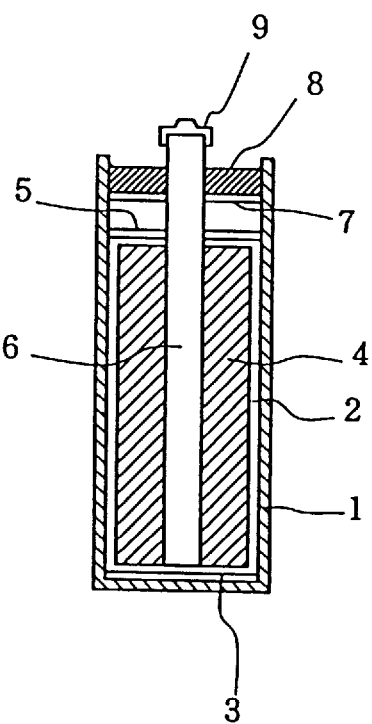
FIG. 1 is a cross-sectional view of the R6 manganese dry cell prepared in the Examples and Comparative Examples.

This electrolytic manganese dioxide was used as a cathode active material to prepare an R6 manganese dry cell, shown in FIG. 1. This dry cell was subjected to a 300 mA continuous discharge test (final voltage 0.9 V) at 20° C. initial and a 300 mA contintious discharge test (final voltage 0.9 V) after storage at 45° C. for one month. The results are summarized in Table 1. In FIG. 1, numeral 1 designates a Zn can (anode), numeral 2 a separator, numeral 3 a bottom paper, numeral 4 a cathode mix, numeral 5 a top paper, numeral 6 a carbon rod, numeral 7 a top cover, numeral 8 a sealant, and numeral 9 a cathode cap.

In this case, the mixing weight ratio of the electrolytic manganese dioxide to the conductive acetylene black used as a cathode active material for regulating the weight of the electrolytic manganese dioxide in one R6 manganese dry cell was as given in Table 1, and the electrolyte prepared comprised 30% by weight of zinc chloride and 70% by weight of water. The zinc chloride was used in an amount of 47.6% by weight and had a specific gravity of 1.53. The conductive acetylene black used had a BET specific surface area of 70 m²/g.

In this connection, it should be noted that the mixing ratio of the eletrolytic manganese dioxide, the conductive acetylene black, and the electrolyte as described above is a mere example and may be properly modified according to the structure of cells.

Example 2

An electrolytic manganese dioxide, which had been electrodeposited in a sulfate bath under conditions of current density 50 A/m², electrolyte temperature 95° C. (constant), and manganese: sulfuric acid molar ratio in electrolyte=1.5, was treated in the same manner as in Example 1, neutralized with ammonium hydroxide as an alkaline ammonium compound, subjected to hydrothermal treatment at 90° C. for 12 hr, dried at 40° C. for one hr, and pulverized to an average particle diameter of about 25 μm, thereby preparing an electrolytic manganese dioxide.

The preparation of an R6 manganese dry cell followed by a discharge test was carried out in the same manner as in Example 1, except that the electrolytic manganese dioxide prepared just above was used. The results are summarized in Table 1. In this case, the conductive acetylene black used was the same as that in Example 1, that is, had a BET specific surface area of 70 m²/g.

Example 3

An electrolytic manganese dioxide, which has been electrodeposited in a sulfate bath under conditions of current density 60 A/m², electrolyte temperature 95° C. (constant), and manganese: sulfuric acid molar ratio in electrolyte=1.0, was treated in the same manner as in Example 1, neutralized with ammonium hydroxide as an alkaline ammonium compound, subjected to hydrothermal treatment at 90° C. for 20 hr, dried at 40° C. for one hr, and pulverized to an average particle diameter of about 25 μm, thereby preparing an electrolytic manganese dioxide.

The preparation of an R6 manganese dry cell followed by a discharge test was carried out in the same manner as in Example 1, except that the electrolytic manganese dioxide prepared just above was used and that the mixing weight ratio of the electrolytic manganese dioxide to the conductive acetylene black in the cathode mix was varied. The results are summarized in Table 1. Ln this case, the conductive acetylene black used had a BET specific surface area of 60 m²/g.

Example 4

Hydrothermal treatment and product finishing treatment were conducted in the same manner as in Example 3, thereby preparing an electrolytic manganese dioxide.

The preparation of an R6 manganese dry cell followed by a discharge test was carried out in the same manner as in Example 1, except that the electrolytic manganese dioxide prepared just above was used. The results are summarized in Table 1. In this case, the conductive acetylene black used had a BET specific surface area of 70 m²/g.

Example 5

Hydrothermal treatment and product finishing treatment were conducted in the same manner as in Example 3, thereby preparing an electrolytic manganese dioxide.

The preparation of an R6 manganese dry cell followed by a discharge test was carried out in the same manner as in Example 1, except that the electrolytic manganese dioxide prepared just above was used and that the mixing weight ratio of the electrolytic manganese dioxide to the conductive acetylene black in the cathode mix was varied. The results are summarized in Table 1. In this case, the conductive acetylene black used had a BET specific surface area of 130 m²/g.

Example 6

Hydrothermal treatment and product finishing treatment were conducted in the same manner as in Example 3, thereby preparing an electrolytic manganese dioxide.

The preparation of an R6 manganese dry cell followed by a discharge test was carried out in the same manner as in Example 1, except that the electrolytic manganese dioxide prepared just above was used and that the mixing weight ratio of the electrolytic manganese dioxide to the conductive acetylene black in the cathode mix was varied. The results are summarized in Table 1. In this case, the conductive acetylene black used had a BET specific surface area of 200 m²/g.

Example 7

Hydrothermal treatment and product finishing treatment were conducted in the same manner as in Example 3, thereby preparing an electrolytic manganese dioxide.

The preparation of an R6 manganese dry cell followed by a discharge test was carried out in the same manner as in Example 1, except that the electrolytic manganese dioxide prepared just above was used and that the mixing weight ratio of the electrolytic manganese dioxide to the conductive acetylene black in the cathode mix was varied. The results are summarized in Table 1. In this case, the conductive acetylene black used had a BET specific surface area of 250 m²/g.

Comparative Example 1

3 kg of an electrolytic manganese dioxide, which has been electrodeposited in a sulfate bath under conditions of current density 50 A/m$^2$, electrolyte temperature 90° C. (constant), and manganese: sulfuric acid molar ratio in electrolyte=1.5, was neutralized with ammonium hydroxide to prepare an electrolytic manganese dioxide.

The preparation of an R6 manganese dry cell followed by a discharge test was carried out in the same manner as in Example 1, except that the electrolytic manganese dioxide prepared just above was used and that the mixing weight ratio of the electrolytic manganese dioxide to the conductive acetylene black in the cathode mix was varied. The results are summarized in Table 1. In this case, the conductive acetylene black used had a BET specific surface area of 60 m$^2$/g.

Comparative Example 2

Product finishing treatment was carried out in the same manner as in comparative Example 1, thereby preparing an electrolytic manganese dioxide.

The preparation of an R6 manganese dry cell followed by a discharge test was carried out in the same manner as in Example 1, except that the electrolytic manganese dioxide prepared just above was used and that the mixing weight ratio of the electrolytic manganese dioxide to the conductive acetylene black in the cathode mix was varied. The results are summarized in Table 1. In this case, the conductive acetylene black used had a BET specific surface area of 200 m$^2$/g.

Comparative Example 3

Product finishing treatment was conducted in the same manner as in Example 1, except that ammonium carbonate was used as the alkaline ammonium compound and that the heat treatment was conducted in air at 180° C. for 4 hr, thereby preparing an electrolytic manganese dioxide.

The preparation of an R6 manganese dry cell followed by a discharge test was carried out in the same manner as in Example 1, except that the electrolytic manganese dioxide prepared just above was used and that the mixing weight ratio of the electrolytic manganese dioxide to the conductive acetylene black in the cathode mix was varied. The results are summarized in Table 1. In this case, the conductive acetylene black used had a BET specific surface area of 130 m$^2$/g.

Comparative Example 4

An electrolytic manganese dioxide, which had been electrodeposited in a sulfate bath under conditions of current density 70 A/m$^2$, electrolyte temperature 90° C. (constant), and manganese: sulfuric acid molar ratio in electrolyte=2.0, was treated in the same manner as in Example 1, neutralized with ammonium hydroxide as an alkaline ammonium compound, subjected to hydrothermal treatment at 95° C. for 48 hr, dried at 40° C. for one hr, and pulverized to an average particle diameter of about 25 μm, thereby preparing an electrolytic manganese dioxide.

The preparation of an R6 manganese dry cell followed by a discharge test was carried out in the same manner as in Example 1, except that the electrolytic manganese dioxide prepared just above was used. The results are summarized in Table 1. In this case, the conductive acetylene black used had a BET specific surface area of 70 m$^2$/g.

Comparative Example 5

An electrolytic manganese dioxide, which had been electrodeposited in a sulfate bath under conditions of current density 50 A/m$^2$, electrolyte temperature 95° C. (constant), and manganese: sulfuric acid molar ratio in electrolyte=1.0, was treated in the same manner as in Example 1, neutralized with ammonium hydroxide as an alkaline ammonium compound, subjected to hydrothermal treatment at 40° C. for 48 hr, dried at 40° C. for one hr, and pulverized to an average particle diameter of about 25 μm, thereby preparing an electrolytic manganese dioxide.

The preparation of an R6 manganese dry cell followed by discharge test was carried out in the same manner as in Example 1, except that the electrolytic manganese dioxide prepared just above was used. The results are summarized in Table 1. In this case, the conductive acetylene black used was the same as that in Example 1, that is, had a BET specific surface area of 70 m$^2$/g.

Figure 2:
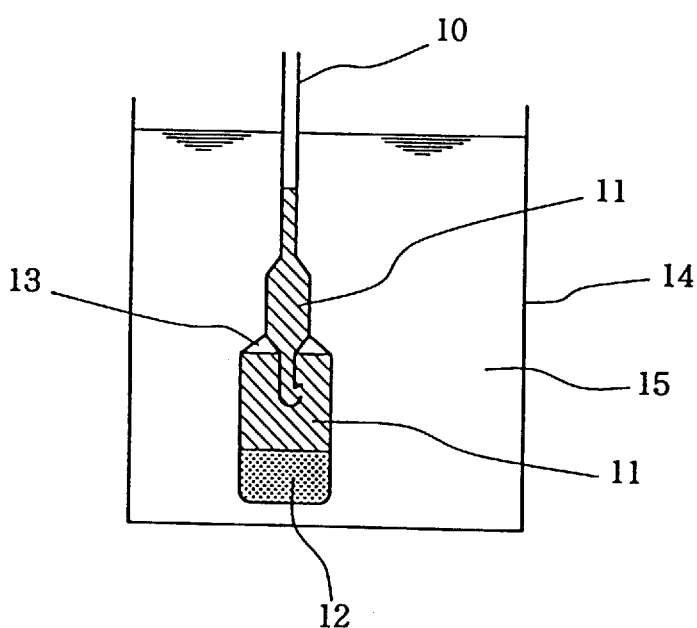
FIG. 2 is an apparatus for the measurement of the amount of gas evolved, used in the Examples and Comparative Examples.

Each sample was then tested for the amount of gas evolved as follows. 5 g of a cathode mix was placed in a glass cell, for the measurement of generation of a gas, as shown in FIG. 2, 5 ml of an electrolyte was poured into the glass cell, and the glass cell was then filled with a liquid paraffin and immersed in a vessel kept at 45° C., followed by the measurement of the amount of gas evolved for one week. In FIG. 2, numeral 10 a micropipette, numeral 11 a liquid paraffin, numeral 12 a cathode mix, numeral 13 an evolved gas, numeral 14 a thermostatic water bath, and numeral 15 warm water (45° C.; constant).

The cathode mix was prepared in the same manner as described above in connection with the preparation of the R6 manganese dry cell. Further, the electrolyte and the conductive acetylene black used were also the same as those described above in connection with the preparation of the R6 manganese dry cell.

For each sample, the amount of gas evolved, together with the results of discharge test for the R6 manganese dry cell, is given in Table 1. Further, for each sample, the results of analysis for the water content and the value x in MnOx are also given in Table 1.

TABLE 1

| Ex. & Comp. Ex. | value X in MnO$_2$ | Water content moisture (RT~107° C.) Adhesive | Bound water (120~400° C.) | BET of conductive acetylene black (m$^2$/g) | *1 M:C | 300 mA continuous discharge duration (min) Initial at 20° C. | After storage at 45° C. for one month | *2 Remaining ratio (%) | *3 Relative amount of gas evolved |
|---|---|---|---|---|---|---|---|---|---|
| Ex. 1 | 1.90 | 2.3 | 3.4 | 70 | 7:1 | 77 | 65 | 84 | 60 |
| Ex. 2 | 1.96 | 2.3 | 3.4 | 70 | 7:1 | 78 | 65 | 83 | 62 |
| Ex. 3 | 1.93 | 2.3 | 3.4 | 60 | 6:1 | 72 | 63 | 88 | 66 |
| Ex. 4 | 1.93 | 2.3 | 3.4 | 70 | 7:1 | 79 | 58 | 73 | 69 |

TABLE 1-continued

| Ex. & Comp. Ex. | value X in MnO$_2$ | Water content | | BET of conductive acetylene black (m$^2$/g) | *1 M:C | 300 mA continuous discharge duration (min) | | *2 Remaining ratio (%) | *3 Relative amount of gas evolved |
|---|---|---|---|---|---|---|---|---|---|
| | | Adhesive moisture (RT~107° C.) | Bound water (120~400° C.) | | | Initial at 20° C. | After storage at 45° C. for one month | | |
| Ex. 5 | 1.93 | 2.3 | 3.4 | 130 | 10:1 | 81 | 57 | 70 | 72 |
| Ex. 6 | 1.93 | 2.3 | 3.4 | 200 | 11:1 | 82 | 53 | 65 | 75 |
| Ex. 7 | 1.93 | 2.3 | 3.4 | 250 | 12:1 | 84 | 51 | 61 | 80 |
| Comp. Ex. 1 | 1.97 | 2.3 | 3.4 | 60 | 6:1 | 74 | 46 | 62 | 100 |
| Comp. Ex. 2 | 1.97 | 2.3 | 3.4 | 200 | 11:1 | 83 | 35 | 42 | 125 |
| Comp. Ex. 3 | 1.97 | 0.7 | 2.9 | 130 | 10:1 | 50 | 32 | 64 | 130 |
| Comp. Ex. 4 | 1.89 | 2.3 | 3.0 | 70 | 7:1 | 51 | 46 | 90 | 43 |
| Comp. Ex. 5 | 1.97 | 2.3 | 3.4 | 70 | 7:1 | 74 | 47 | 63 | 90 |

*1: Mixing weight ratio of electrolytic manganese dioxide (M) to conductive acetylene black (C) in cathode mix.
*2: Remaining ratio (%) of the discharge duration after storage at 45° C. for one month with the discharge duration immediately after the preparation of the cell being presumed to be 100%.
*3: The amount of gas evolved, after storage at 45° C. for one week, expressed in terms of an index with the amount of gas evolved in Comparative Example 1 being presumed to be 100%.

From the results, of Examples 1, 2 and 4 and Comparative Examples 4 and 5, summarized in Table 1, it is apparent that when the value x in MnOx was less than 1.90, the initial (20° C.; immediately after the preparation of the cell) discharge characteristics were deteriorated, while when it exceeded 1.96, the discharge characteristics and the remaining ratio after storage at 45° C. for one month were deteriorated.

Comparison of Examples 3 to 7 with Comparative Example 1 shows that, as compared with the cell of Comparative Example 1, the cell of Example 3 using a conductive acetylene black having a BET specific surface area of 60 m$^2$/g had somewhat inferior initial characteristics but better storage properties. Further, the cells of Examples 4 to 7, using a conductive acetylene black having a BET specific surface area of 70 to 250 m$^2$/g were superior to the cell of Comparative Example 1 in initial characteristics, as well as in storage properties. Therefore, the specific surface area of the conductive acetylene black is preferably 70 to 250 m$^2$/g from the viewpoint of improving both the initial charateristics and storage properties.

From test results for the cell of Comparative Example 2, it is apparent that, in the case of the conventional electrolytic manganese dioxide, when the BET specific surface area of the acetylene black was 200 m$^2$/g, both the remaining ratio and the storage properties were remarkably deteriorated although improved initial discharge characteristics could be provided.

From Comparative Example 3, it is apparent that since the contents of adhesive moisture and bound water, which are very important for discharge charateristics of the manganese dry cell, were low, that is, respectively 0.7% by weight and 2.9% by weight, both the cell characteristics and the storage properties were remarkably deteriorated.

Comparison of Example 3 with Comparative Example 1 and comparison of Example 6 with Comparative Example 2 show that, unlike the conventional electrolytic manganese dioxide, the electrolytic manganese dioxide, which had been subjected to hydrothermal treatment, could prevent the reaction thereof with the conductive acetylene black to prevent the evolution of gas.

The use of an electrolytic manganese dioxide having particular properties as a cathode active material in combination with a conductive acetylene black as a cathode mix enables the preparation of a manganese dry cell having excellent storage properties. In addition, when the conductive acetylene black has a BET specific surface area of 70 to 250 m$^2$/g, it is possible to prepare a manganese dry cell improved in storage properties, as well as in initial discharge characteristics.

What is claimed:

1. A process for preparing an electrolytic manganese dioxide for a manganese dry cell having a composition of MnO$_x$, wherein x is 1.90 to 1.96, an adhesive moisture content of not less than 1.5% by weight as measured according to the procedure specified in JIS K 1467-1984 and a content of bound water, eliminative in a temperature range of 120° to 400° C., of not less than 3.0% by weight as measured by gravimetry, comprising the step of: heating a powdery or chipped electrolytic manganese dioxide which is obtained by electrodeposition in a sulfate bath under a condition of a molar ratio of manganese to sulfuric acid in electrolyte ranging from 1.0 to 1.5, after electrolysis, during or after neutralization, in an aqueous solution at 50° to 100° C. and for 12 to 48 hours in the presence of an alkaline ammonium compound selected from the group consisting of ammonium hydroxide, ammonium carbonate and ammonium bicarbonate.

2. An electrolytic manganese dioxide for a manganese dry cell, produced by a process comprising the step of heating a powdery or chipped electrolytic manganese dioxide, which is obtained by electrodeposition in a sulfate bath under a condition of a molar ratio of manganese to sulfuric acid in electrolyte ranging from 1.0 to 1.5, after electrolysis and during or after neutralization, in an aqueous solution at 50° to 100° C. and for 12 to 48 hours in the presence of an alkaline ammonium compound selected from the group consisting of ammonium hydroxide, ammonium carbonate and ammonium bicarbonate, said electrolytic manganese dioxide having a composition of MnO$_x$, wherein x is 1.90 to 1.96, an adhesive moisture content of not less than 1.5% by weight as measured according to the procedure specified in JIS K 1467-1984, and a content of bound water, eliminative in a temperature range of 120° to 400° C., of not less than 3.0% by weight as measured by gravimetry.

3. A manganese dry cell comprising a cathode mix comprised of a mixture of an electrolytic manganese dioxide with a conductive acetylene black and an electrolyte consisting essentially of a compound selected from the group consisting of zinc chloride, ammonium chloride and mixtures thereof, said electrolytic manganese dioxide being produced by a process comprising the step of heating a powdery or chipped electrolytic manganese dioxide after electrolysis and during or after neutralization in an aqueous solution at 50° to 100° C. in the presence of an alkaline ammonium compound, said electrolytic manganese dioxide having a composition of $MnO_x$, wherein x is 1.90 to 1.96, an adhesive moisture content of not less than 1.5% by weight as measured according to the procedure specified in JIS K 1467-1984, and a content of bound water, eliminative in the temperature range of 120° to 400° C., of not less than 3.0% by weight as measured by gravimetry.

4. The manganese dry cell according to claim 3, wherein the conductive acetylene black has a BET specific surface area of 70 to 250 $m^2/g$.

* * * * *